United States Patent [19]

Scales, III et al.

[11] Patent Number: 5,996,057
[45] Date of Patent: Nov. 30, 1999

[54] DATA PROCESSING SYSTEM AND METHOD OF PERMUTATION WITH REPLICATION WITHIN A VECTOR REGISTER FILE

[75] Inventors: Hunter Ledbetter Scales, III, Austin, Tex.; Keith Everett Diefendorff, Los Gatos, Calif.; Brett Olsson, Cary, N.C.; Pradeep Kumar Dubey, New Delhi, India; Ronald Ray Hochsprung, Los Gatos, Calif.

[73] Assignees: Apple, Cupertino, Calif.; IBM, Armonk, N.Y.; Motorola Inc., Schaumburg, Ill.

[21] Appl. No.: 09/062,100

[22] Filed: Apr. 17, 1998

[51] Int. Cl.$^6$ ............................... G06F 9/305; G06F 9/34
[52] U.S. Cl. ....................................... 712/5; 712/7; 712/4
[58] Field of Search ................... 395/800.04, 800.05, 395/800.01, 800.23, 705, 800.08; 364/DIG. 1, DIG. 2; 711/118, 3, 130, 157; 712/21, 9, 1, 24, 11, 213, 3.4, 5, 22; 380/25; 713/323, 324

[56] References Cited

U.S. PATENT DOCUMENTS 5,553,309   9/1996   Asai et al. ......................... 395/800.04
5,990,821   8/1998   Pflum ................................. 395/800.04

OTHER PUBLICATIONS

Hewlett Packard, "64–bit and Multimedia Extensions in the PA–RISC 2.0 Architecture", Computing Directory Technologies Precision Architecture Document, "MIPS Digital Media Extension", Rev 1.0 C–1 through C40 (1997).

*Primary Examiner*—Daniel H. Pan

[57] ABSTRACT

The data processing system of the present invention loads three input operands, including two input vectors and a control vector, into vector registers and performs a permutation of the two input vectors as specified by the control vector, and further stores the result of the operation as the output operand in an output register. The control vector consists of sixteen indices, each uniquely identifying a single byte of input data in either of the input registers, and can be specified in the operational code or be the result of a computation previously performed within the vector registers. The specification of the control vector allows a vector-matrix operation to be performed on the input vectors by rearranging or replicating the input operand bytes in the bytes of the output register as a function of the control vector. This system provides a highly efficient register loading mechanism for data vectors misaligned in memory, and allows the computation of a serially dependent chain of binary functions within the vector registers.

9 Claims, 5 Drawing Sheets

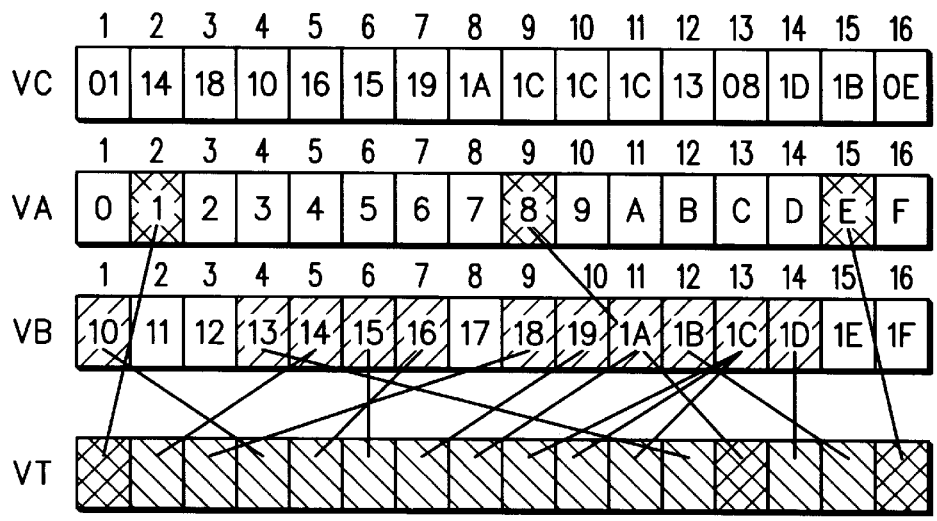

FIG. 7

SH ← ADDR$_{60:63}$

IF SH = 0x0 THEN (VC)$_{0:127}$ ← 0x1 0111213141516171819 1A 1B 1C 1D 1E 1F
IF SH = 0x1 THEN (VC)$_{0:127}$ ← 0x0F 10111213141516171819 1A 1B 1C 1D 1E
IF SH = 0x2 THEN (VC)$_{0:127}$ ← 0x0E 0F 10111213141516171819 1A 1B 1C 1D
IF SH = 0x3 THEN (VC)$_{0:127}$ ← 0x0D 0E 0F 10111213141516171819 1A 1B 1C
IF SH = 0x4 THEN (VC)$_{0:127}$ ← 0x0C 0D 0E 0F 10111213141516171819 1A 1B
IF SH = 0x5 THEN (VC)$_{0:127}$ ← 0x0B 0C 0D 0E 0F 10111213141516171819 1A
IF SH = 0x6 THEN (VC)$_{0:127}$ ← 0x0A 0B 0C 0D 0E 0F 1011121314151617 1819
IF SH = 0x7 THEN (VC)$_{0:127}$ ← 0x0 90A0B0C0D0E0F 10111213141516 1718
IF SH = 0x8 THEN (VC)$_{0:127}$ ← 0x0 8090A0B0C0D0E0F 1011121314 151617
IF SH = 0x9 THEN (VC)$_{0:127}$ ← 0x0 708090A0B0C0D0E0F 10111213 141516
IF SH = 0xA THEN (VC)$_{0:127}$ ← 0x0 60708090A0B0C0D0E0F 101112 131415
IF SH = 0xB THEN (VC)$_{0:127}$ ← 0x0 5060708090A0B0C0D0E0F 1011 121314
IF SH = 0xC THEN (VC)$_{0:127}$ ← 0x0 405060708090A0B0C0D0E0F 10 111213
IF SH = 0xD THEN (VC)$_{0:127}$ ← 0x0 30405060708090A0B0C0D0E0F 101112
IF SH = 0xE THEN (VC)$_{0:127}$ ← 0x0 2030405060708090A0B0C0D0E0F 1011
IF SH = 0xF THEN (VC)$_{0:127}$ ← 0x0 102030405060708090A0B0C0D0E0F 10

FIG. 8

DATA PROCESSING SYSTEM AND METHOD OF PERMUTATION WITH REPLICATION WITHIN A VECTOR REGISTER FILE

CROSS-REFERENCE TO RELATED APPLICATION

This application is related to our co-pending U.S. patent application Ser. No. 09/062,152 entitled "DATA PROCESSING SYSTEM AND METHOD OF GENERATING A CONTROL VECTOR FOR VECTOR LOADING AND ALIGNMENT VIA PERMUTATION WITHIN A VECTOR REGISTER FILE", filed concurrently herewith and assigned to the same assignee herein.

FIELD OF THE INVENTION

The present invention relates in general to a method and system for data processing, and in particular to a method and system for permutation with replication of operands within a data processing system.

BACKGROUND OF THE INVENTION

Applications of modern computer systems are requiring greater speed and data handling capabilities for uses such as multimedia and scientific modeling. For example, multimedia systems generally are designed to perform video and audio data compression, decompression, and high-performance manipulation such as 3-dimensional imaging. Massive data manipulation and an extraordinary amount of high-performance arithmetic, including vector-matrix operations such as DOT product, vector cross-product and vector transposition, are required for performing graphic image rendering such as computer-generated 3-dimensional images.

To perform large vector-matrix operations at high speed in a register based system, a method of fast, efficient vector register loading is required. In modern data processing systems, a critical speed path is between the cache and the register file. Therefore, the load and store functions must be optimized to provide the greatest speed possible. As is done in the prior art, the load is performed by retrieving a cache block from a cache and loading it into a register file. In most systems, the data is re-aligned or shifted from the arbitrary alignment in the memory to a proper vector alignment in the register by passing the data through an alignment multiplexer placed in the data path between the memory and the register file. This alignment is required because a vector stored in memory is a sequential string of bytes that may have no natural alignment in memory. The alignment multiplexer shifts the input data into alignment prior to being loaded into the registers to assure that the data, which is retrieved from memory on an address boundary, is properly aligned to the beginning of the vector in the register. Thus, one limitation of the prior art high-speed data processing systems is the inclusion of an alignment multiplexer circuit in a critical data path, which creates inefficient register loading and reduces clock frequency.

In addition, to perform large vector-matrix operations at high speed, a method of fast and efficient data permutation is required. In a register-based computer architecture, permutation of data is commonly done by reading data from a register and rearranging the data into another register. In the prior art, such permutation of data is performed by loading input bytes (i.e. an input data vector) into a first register and loading a control vector into a second register. The control vector indicates how the input data vector is to be rearranged in an output register to implement a given function. Such systems limit the processor to performing unary serially dependent functions (e.g. $Y=f1(f2(f3(f4( \ldots f(A) \ldots )$, because only a single input operand is available. To perform a serially dependent vector computation, the control register is loaded with a control vector to perform the desired function and the input register is loaded with the previous result operand of the function chain. Therefore, another significant limitation of the prior art high-speed data processing systems is that there is no possibility of performing a mathematical operation of a serially dependent chain of binary (or higher N-ary) functions (e.g. $Y=f1(f2(f3(f4( \ldots f(A, B) \ldots )$) and thus severely limits the types of vector operations that the prior art processors can perform.

As will now be appreciated, it would be advantageous to provide a data processing system that allows a method of fast and efficient data permutation and register loading. Such a system would provide aligned data vectors within the register file without requiring an alignment multiplexer and therefore would increase processing speed. Further, it would be desirable for such a system to have the capability to execute a serially dependent chain of N-ary functions.

BRIEF DESCRIPTION OF THE DRAWINGS

FIG. 7 shows a conceptual diagram of the vector registers as used in one example of a PWR operation performed in the data processing system of the present invention, in accordance with a preferred embodiment of the present invention.

FIG. 8 shows an example of a look-up table for 16-byte vector processing unit, wherein the pseudo-code for setting the control vector in register VC for the operation of loading and aligning a data vector in the system of a preferred embodiment is shown.

DESCRIPTION OF A PREFERRED EMBODIMENT

The data processing system of the present invention allows the specification of three input operands, including two input vectors and a control vector, and one output operand, wherein the input operands are loaded into vector registers and a Permute-With-Replication (PWR) operation is performed on the two input vectors as specified by the control vector, and further wherein the result is stored as the output operand in an output register. The control vector consists of sixteen indices, each uniquely identifying a single byte of input data in either of the input registers, thereby specifying a unique byte within the two input operands. The control vector can be specified in the operational code or be the result of a computation previously performed within the vector registers. This specification of the control vector allows a vector-matrix operation to be performed on two input vectors by rearranging the input operand bytes in the output register by a function of setting the control register. This system provides a highly efficient register loading mechanism for data vectors misaligned in memory. Further, the system allows a computation requiring a serially dependent chain of binary functions to be performed within the vector registers.

Figure 1:
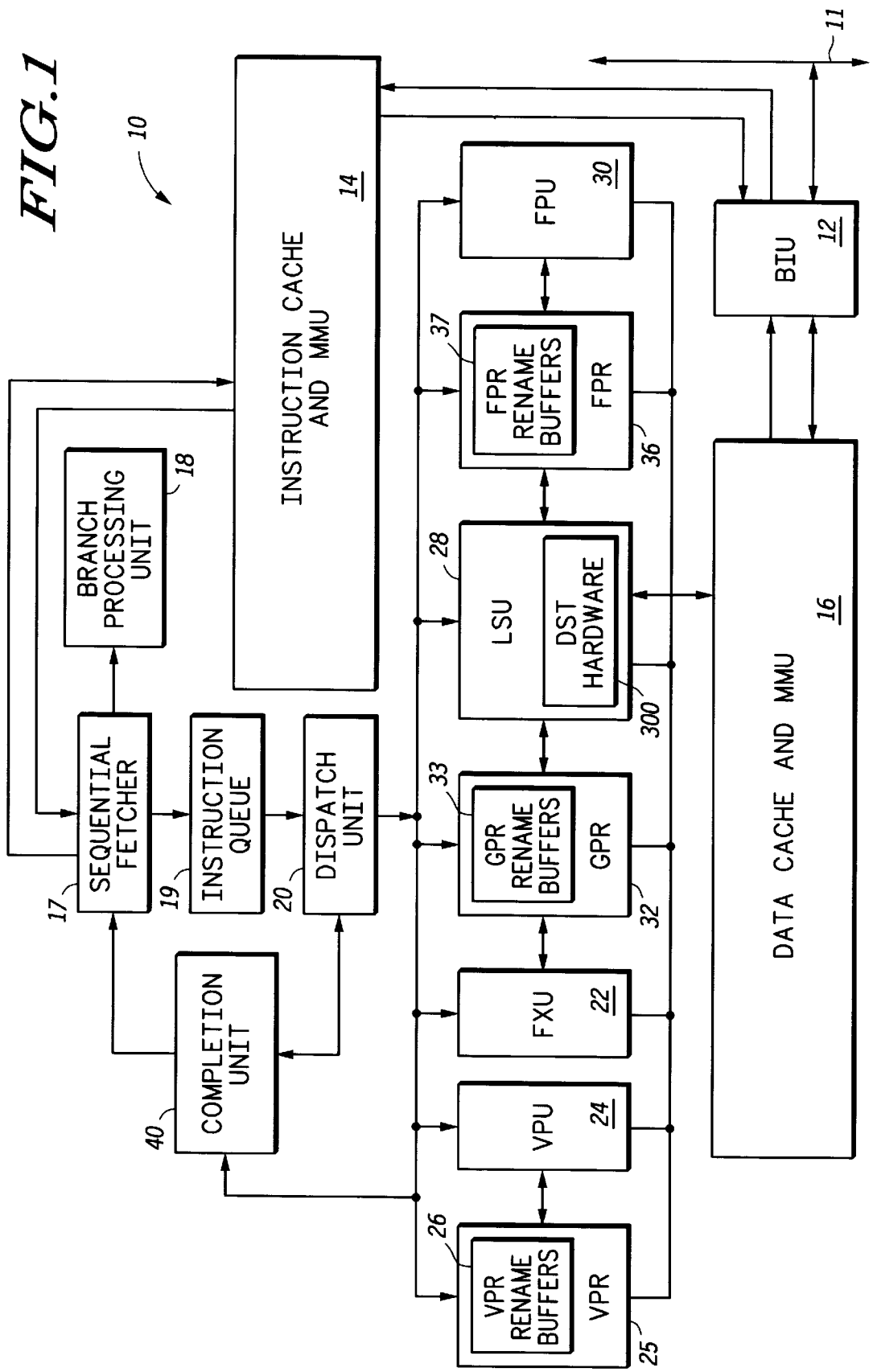
FIG. 1 is a block diagram of a processor for processing information according to a preferred embodiment of the present invention.

With reference now to the figures, and in particular with reference to FIG. 1, there is illustrated a block diagram of a processor, indicated generally at 10, for processing information according to a preferred embodiment of the present invention. In the depicted embodiment, processor 10 comprises a single integrated circuit superscalar microprocessor capable of executing multiple instructions per processor cycle. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors produced by Motorola, Inc., which operates according to reduced instruction set computing (RISC) techniques and the single instruction, multiple data (SIMD) instruction architecture. All SIMD instructions operate on fixed-length vectors, each instruction performing the same operation on corresponding elements in the source vector operands. SIMD instruction architecture is an important computer architecture for performing large vector-matrix operations at high speed and handling large amounts of data and computations for multimedia applications.

As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not illustrated). Processor 10, system bus 11, and the other devices coupled to system bus 11 together form a host data processing system. BIU 12 is connected to instruction cache 14 and data cache 16 within processor 10. High speed caches, such as instruction cache 14 and data cache 16, enable processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 for execution.

Sequential fetcher 17 transfers branch instructions to branch processing unit (BPU) 18 for execution, and transfers sequential instructions to instruction queue 19 for temporary storage before being executed by other execution circuitry within processor 10. BPU 18 executes branch instructions, which change the sequence in which the instructions in the computer program are performed, and performs static and dynamic branch prediction on unresolved conditional branches to allow speculative instructions to be fetched and executed. Instructions issued beyond a predicted branch do not complete execution until the branch is resolved, preserving the programming model of sequential execution. Sequential instructions are transferred from instruction queue 19 to dispatch unit 20 to be dispatched to their respective execution units, the dispatch rate being contingent upon execution unit busy status, rename and completion buffer availability, and the serializing behavior of some instructions. Dispatch unit 20 performs source and destination register dependency checking and renaming on instructions dispatched in parallel or out-of-order. Completion unit 40 tracks instructions from dispatch through execution, and then retires, or "completes" them in program order. Completing an instruction commits the process to any architectural register changes caused by that instruction. In-order completion ensures the correct architectural state when the microprocessor must recover from a mispredicted branch or any exception.

In the depicted embodiment, in addition to BPU 18, the execution circuitry of processor 10 comprises multiple execution units, including fixed-point unit (FXU) 22, vector processing unit (VPU) 24, load/store unit (LSU) 28, and floating-point unit (FPU) 30. These execution units can execute instructions simultaneously during a single processor cycle. Each of execution units 18, 22, 24, 28, and 30 can execute one or more instructions within a particular class of instructions. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. VPU 24 performs vector-oriented operations using operands received from vector processing registers (VPRs) 25 or VPR rename buffers 26. FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32, VPRs 25 or FPRs 36, or that store data from a selected one of GPRs 32, GPR rename buffers 33, VPRs 25, VPR rename buffers 26, FPRs 36, or FPR rename buffers 37 to memory.

Processor 10 employs both pipelining and out-of-order execution of instructions to further improve the performance of its superscalar architecture. Accordingly, instructions can be executed by FXU 22, VPU 24, LSU 28, and FPU 30 in any order as long as data dependencies are observed. In addition, instructions are processed by each of FXU 22, VPU 24, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 24, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, processor 10 dispatches instructions in program order and tracks the program order of the dispatched instructions during out-of-order execution utilizing unique instruction identifiers. In addition to an instruction identifier, each instruction within the execution pipeline of processor 10 has an rA tag and a rB tag and/or a rC tag, which indicate the sources of the A and B operands for the instruction, and a rD tag that indicates a destination rename buffer within rename buffers for the result data of the instruction.

During the execute stage, execution units 22, 24, 28, and 30, execute instructions received from dispatch unit 20 opportunistically as operands and execution resources for the indicated operations are available. After execution has finished, execution units 22, 24, 28, and 30 store result data within either GPR rename buffers 33, VPR rename buffers 26, or FPR rename buffers 37, depending upon the instruction type. Then, execution units 22, 24, 28, and 30 notify completion unit 40 which instructions have finished execution. Finally, instructions are completed by completion unit 40 in program order by transferring result data from GPR rename buffers 33, VPR rename buffers 26 and FPR rename buffers 37 to GPRs 32, VPR 25 and FPRs 36, respectively.

Figure 2:
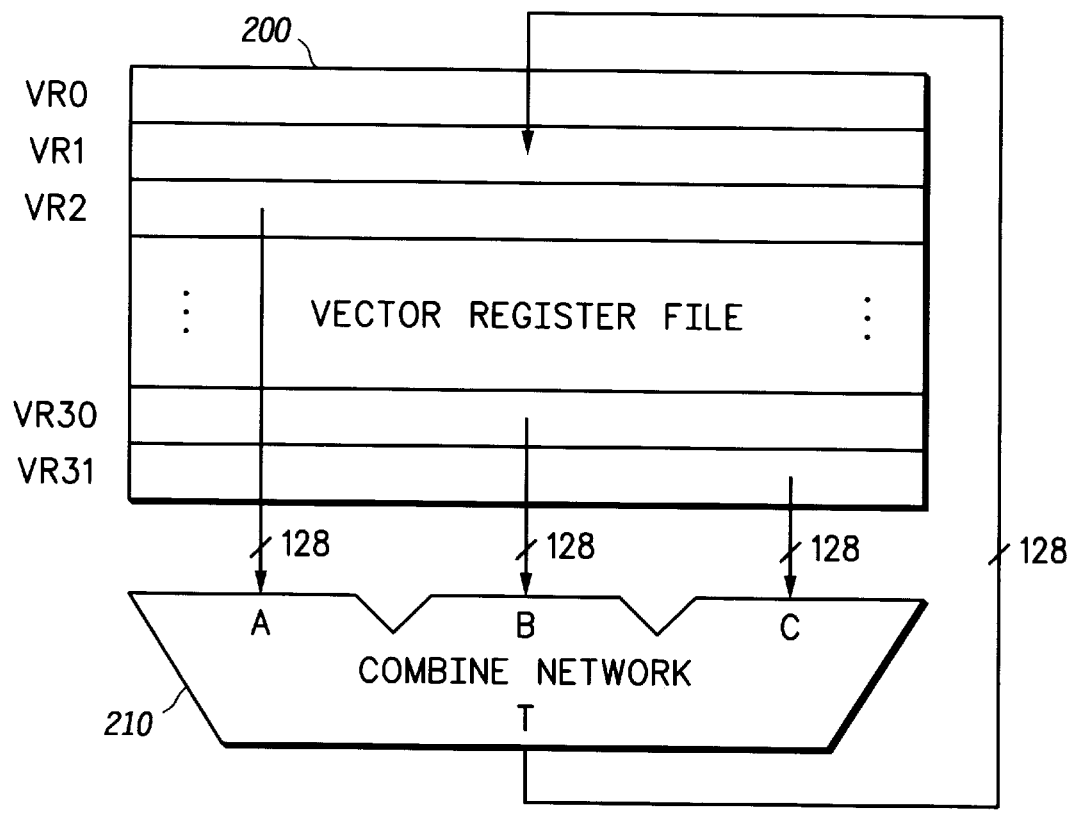
FIG. 2 is a block diagram of the vector processing apparatus of a preferred embodiment of the present invention.
Figure 3:
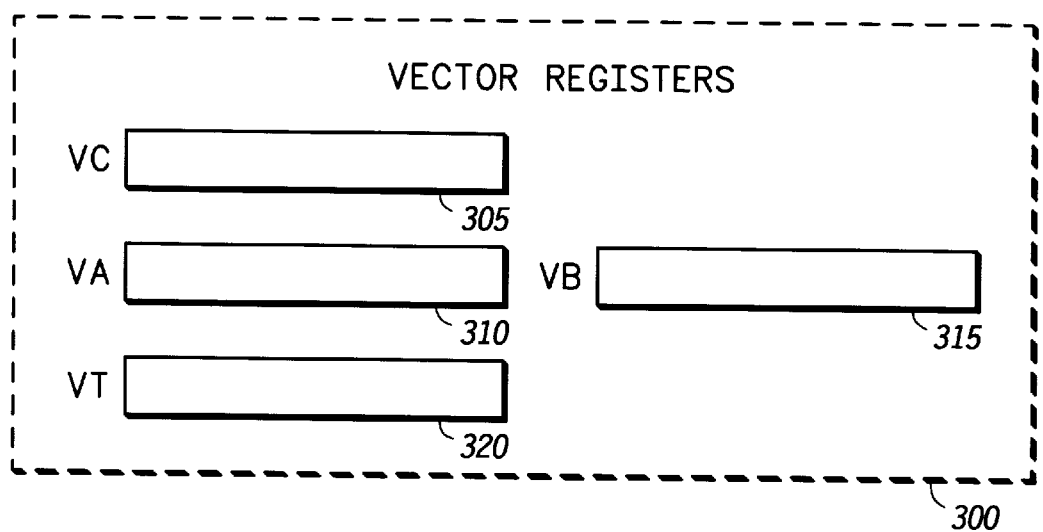
FIG. 3 shows a conceptual diagram of the vector registers involved in a vector PWR function, in accordance with a preferred embodiment of the present invention.

With reference now to FIG. 2, there is shown a block diagram of the vector processing apparatus of a preferred embodiment of the present invention. Vector register file 200 includes thirty-two vector registers VR0–VR31, each being 128 bits or 16 bytes wide. Vector register file 200 is coupled to combine network 210 to provide three vectors (Vector A, Vector B, Vector C) selected from three preselected or programmed registers of the vector register file 200. Combine network 210 provides a full cross-bar function that includes the capability of replicating an input element at the output. A 16-byte output vector is generated at the output (T) of combine network 210 and is loaded into an output register of the vector register file 200. FIG. 3 shows a block diagram of the four specific registers within vector registers 200 utilized to perform the PWR operations of the preferred embodiment. Vector registers 200 include control register 305 (VC) containing the control vector, input registers 310 (VA) and 315 (VB) and the output register 320 (VT).

The vector PWR instruction takes three vector registers as arguments. Two of the registers are logically concatenated to form a single, logical register of 32 fields, with each field indexed by column location from 0 to 32 (0H–1FH). The third input register contains a control vector of 16 indices, each index corresponding to its corresponding column location and indexing to one of the 32 fields of the concatenated registers via its column location. During execution of the PWR operation, the processor places the contents of each field in the concatenated registers indexed by the control vector into the result vector register at the corresponding column location of the index. This allows any combination of the 32 input fields to be permuted into the 16 output fields. Moreover, this allows the combination of selected fields with the replication of any particular input field as part of that combination being allowed by duplicating the column index for that input field in one or more control fields.

In a preferred embodiment, a field within the vector register file 200 is an 8-bit byte. As will be appreciated, any size field can be used in alternative embodiments. Because it is most efficient to load, shift and replicate 8-bit bytes, the control vector has sixteen bytes, each uniquely identifying a byte within the input vector loaded in input registers VA and VB. Since the input vector comprises thirty-two bytes, only five of the eight bits comprising each of the control vector blocks are necessary to uniquely identify a specific input vector block. In alternative embodiments, these unused bits can be utilized to uniquely identify additional fields of input data within a third (or more) additional input register of registers 200. Any additional registers concatenated with the other input registers to form a larger input vector from which the control vector may index would also be combined with the other input vectors (VA, VB) in combine network 210.

Figure 4:
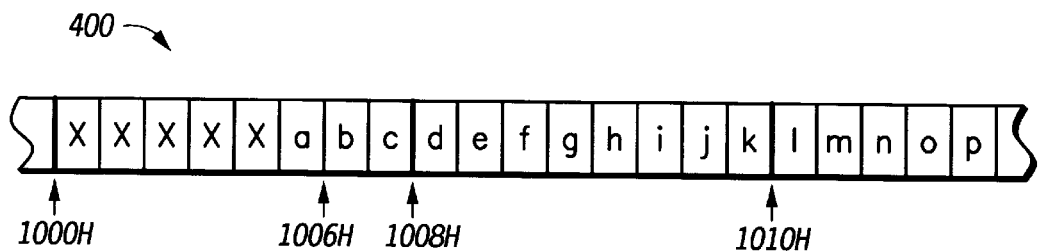
FIG. 4 shows a conceptual diagram of a memory space in a preferred embodiment of the present invention.

FIG. 4 shows a conceptual diagram of a memory space in a preferred embodiment of the present invention. The memory space shows blocks representing bytes of data addressed within the memory space starting at the hexadecimal address boundary 1000 H. The system is optimized for single-dimensioned vectors specified within the memory, with higher dimensions being synthesizable from this vector. A vector of length N-bytes has no natural alignment in memory.

To use a vector instruction (for example, a SIMD instruction), data must first be loaded in one of the vector registers. A register is generally only loaded from memory such as a data cache from an address boundary of a selected modulus (MOD). Thus, memory is addressable in units of modulo M×N, wherein M is equal to the number of bits per fields and N is the number of fields per register. In the example of one preferred embodiment, each register is loaded from memory on an 8-byte boundary of memory 400, where each byte is equal to 8 bits. The 8-byte boundaries shown in FIG. 4 are 1000H, 1008H and 1010H. In another preferred embodiment, each register is a 16-byte register and is loaded from memory on a 16-byte boundary.

Figure 5:
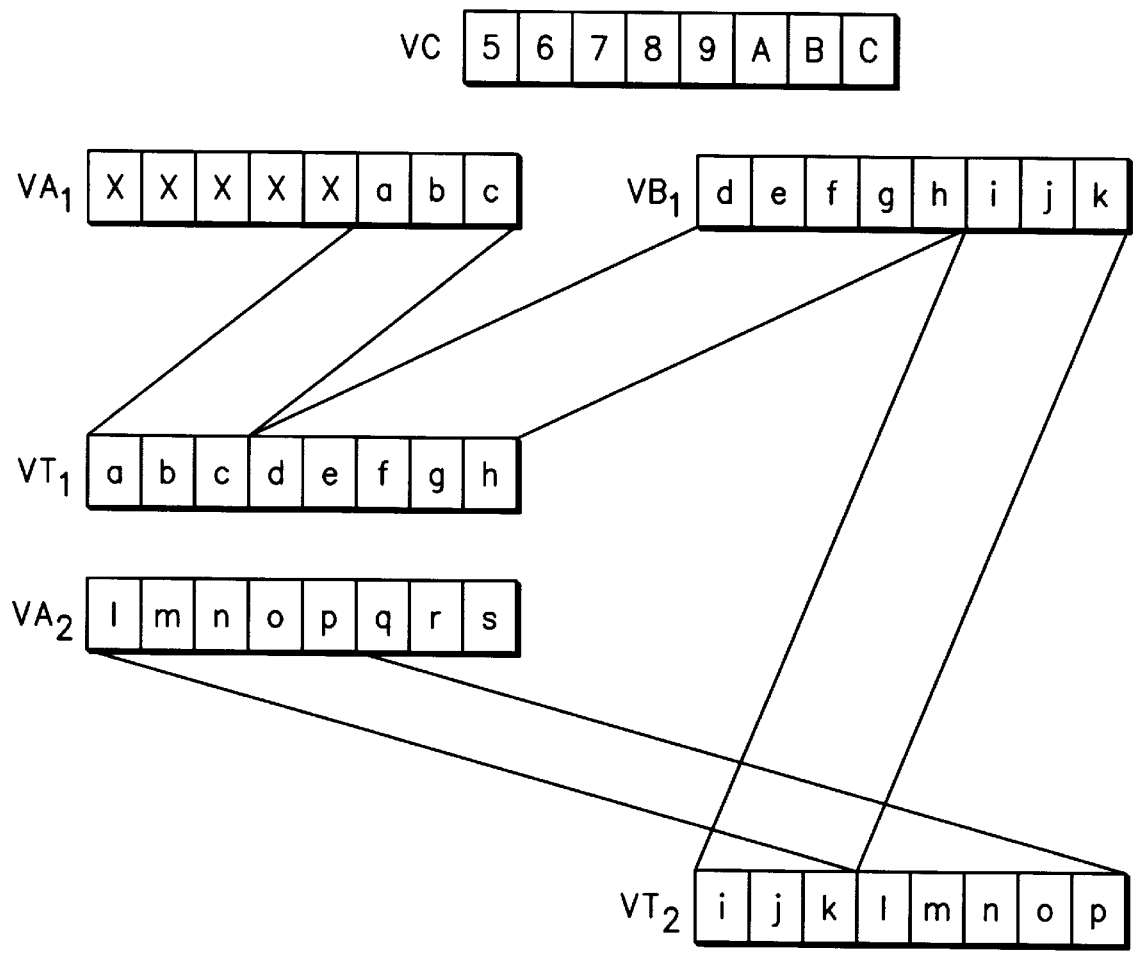
FIG. 5 illustrates a conceptual diagram of one example of the vector PWR function of the system of the present invention as used for aligning vectors loaded from cache memory into the vector registers, in accordance with a preferred embodiment of the present invention.

Referring now to FIG. 5, there is shown a conceptual diagram of one example of the vector PWR function of the system of the present invention as used for aligning vectors loaded from cache memory into the vector registers, in accordance with a preferred embodiment of the present invention. In this example, the system, having 8-byte registers, is retrieving a 16-byte data vector starting with data byte "a" at address boundary 1005 in memory 400 (as seen in FIG. 4) using an 8-byte control vector VC. Initially, register VA at time 1 (indicated in FIG. 5 as $VA_1$) is loaded with an 8-byte input vector from memory 400 starting at address boundary 1000H (since the first byte of the desired vector is contained in this input vector) and register $VB_1$ (register VB at time 1) is loaded with the next eight bytes of data from addresses 1008–1010H.

As seen in FIG. 5, the PWR instruction can be used to extract 16 sequential bytes of data from two input vector registers and selectively load them into the result register, thereby shifting the data to realign it in the register to the vector boundary. This operation of a preferred embodiment of the present invention first executes a load instruction to calculate the effective address of the first byte of the vector and load the vector register with the data beginning at the modulo address boundary closest to the effective address. The calculation of the effective address is also used to generate the control vector. The lower bits of the effective address (in this example, the bottom four bits) indicate the column location of the first byte of the desired vector within the input registers. The first field of the control vector register 305 is set to this column value and the remaining indices of the control vector are set to the next 16 column values of the concatenated registers 310, 315. This can be seen in the example of FIGS. 4 and 5, where the vector control register VC is loaded with a control vector that indicates the first byte ("a") as located at column 5, with the next seven bytes sequentially following.

Then a vector PWR instruction is executed within the data processing system of the present invention to cause the last three bytes in register $VA_1$ and the first five bytes of register $VB_1$ to be loaded into the output register $VT_1$ at time 1. The PWR instruction executes by selecting data first from register VA and then register VB as specified by the control register VC. As an example, the PWR instruction (vperm) would be structured "vperm VT, VA, VB, VC". As will be appreciated, the vector data has been shifted and loaded into the register properly aligned, with the first byte of the vector being loaded in the first byte of the register. To obtain the next eight bytes of the vector data, register $VA_2$ (at time 2 or, alternatively, a third input register) is loaded with the next set of data from memory starting at address boundary 1010H. The control vector does not change, since the alignment shift amount of the vector from an address boundary does not change. A second PWR instruction is executed as specified by the control register VC, but directed to select data first from register VB and then VA (e.g. "vperm VT, VB, VA, VC"). The second PWR instruction loads the output register $VT_2$ (at time 2 or, alternatively, a second output register) with the last three bytes of register $VB_1$ and the first five bytes of register $VA_2$. Because the realignment is occurring in the registers, the critical path between the cache and the register files is not repeated by additional circuitry to provide the realignment, thus allowing a higher rate of data transfer into the register files. Thus, it will be appreciated that a data vector has been loaded and properly aligned into the register file without requiring the additional expense and speed impact of an alignment multiplexer in the data path from cache memory to the register file. Further, the loading process is efficient for a long vector because, as additional bytes of the vector are loaded, the alignment shift amount and, therefore, the control vector does not vary and does not have to be recalculated.

Figure 6:
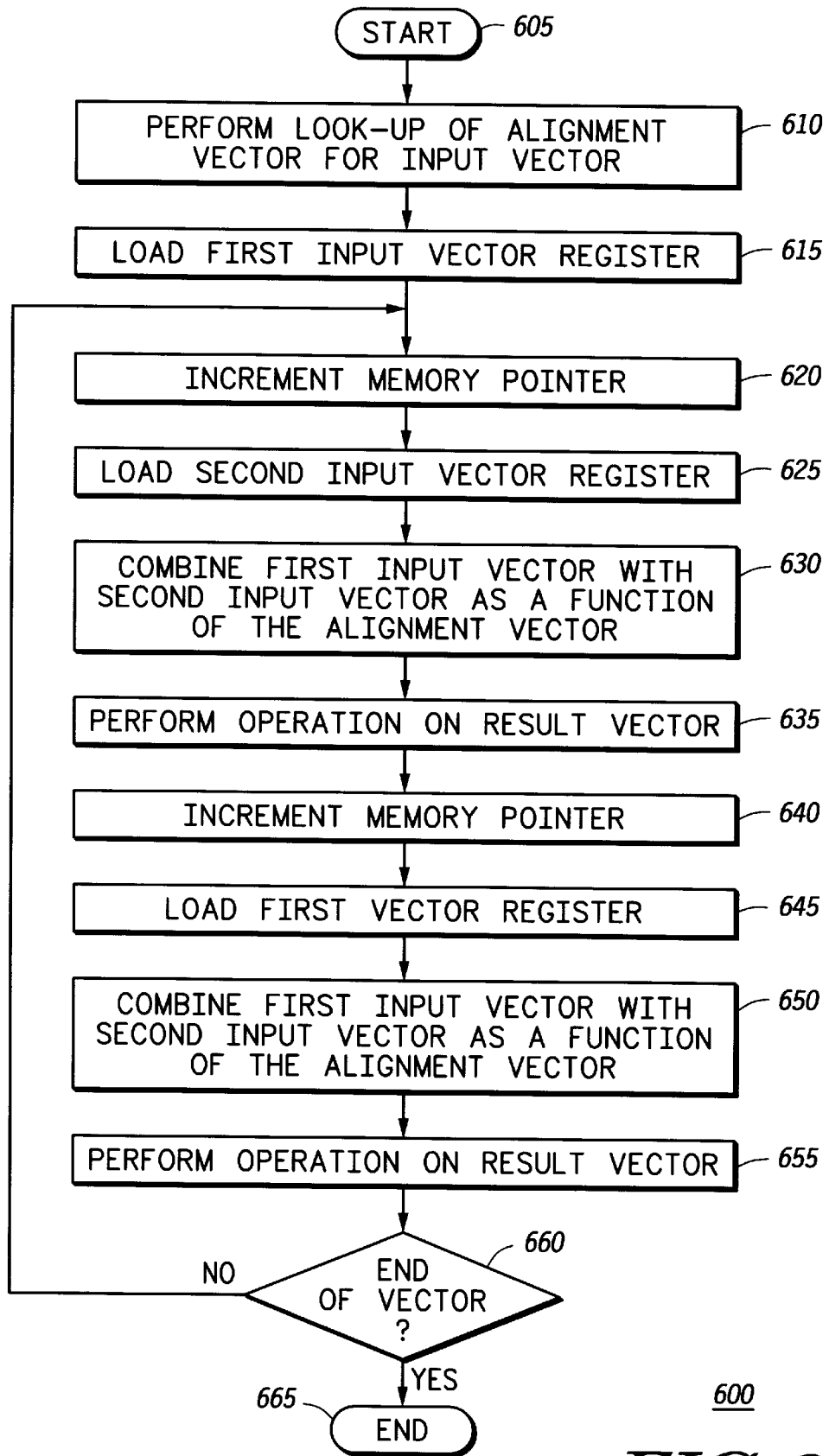
FIG. 6 shows a flow diagram of a method for loading and shifting to properly align a desired vector into the vector register file from memory, in accordance with the preferred embodiment of the present invention.

With reference now to FIG. 6, there is shown a flow diagram 600 of a method for loading and shifting to properly align a desired vector into the vector register file from memory, in accordance with a preferred embodiment of the present invention. The process starts at step 605. In step 610, an alignment vector is determined and loaded into the control register VC. The alignment vector is determined by calculating the appropriate control vector to perform a PWR operation on the two input vectors contained in input registers VA and VB such that the output vector contained in the output register VT is properly loaded with the first eight bytes of the vector. This alignment vector is calculated based on the memory address of the vector within memory 400 as a function of the offset of the memory address of the vector from the previous vector register memory boundary. The alignment vector specifies an offset of a selected vector element of the input vector relative to a base address of the input vector of said second vector: determining the offset of said selected vector element of said first vector. The offset and base address are added to produce an effective address for each of the vector elements.

Alternatively, the determination of the alignment vector is made by performing a look-up within a look-up table. FIG. 8 shows an example of a look-up table for 16-byte vector processing unit, wherein the pseudo-code for setting the control vector in register VC for the operation of loading and aligning a data vector in the system of a preferred embodiment is shown. The variable "sh" is equal to the lower four bits of the effective address of the data vector. This will result in a value for VC being taken from a look-up of the table corresponding with the column position of the first byte of the vector. It can be seen that the control vector is simply formed by sequentially listing the initial vector byte column position, followed by the following column positions wrapping through the last column position of the concatenated registers. Moreover, calculation of the alignment vector can begin in parallel with the operations required to load the first and second input registers with the first sixteen bytes of the input vector. Therefore, the determination of the alignment vector does not impact the critical path.

In step 615, a first set of bytes starting from a memory boundary and containing the beginning of the first input vector is loaded into register VA. A load command by definition will automatically ignore the last low order bits of the memory pointer value when designating the register word within memory 400 to load into the register, thus retrieving the set of bytes starting from a memory boundary. In step 620, the memory pointer is incremented by the register word size (i.e. the size of the input registers). In step 625, a second set of bytes starting from the next memory boundary is loaded from memory 400 into register VB. In step 630, a PWR operation is performed on the first and second input vectors as function of the alignment vector to properly align the first eight bytes of the input vector in the output vector register VT. As seen in FIG. 5, this loads bytes "a–c" from register VA and bytes "d–h" from register VB into vector register VT.

In step 635, a vector operation is performed on the output vector contained in output register VT. Thereafter, the memory pointer is incremented by a vector word at step 640. In step 645, the first vector register VA is loaded with the next register word (third input vector) from memory starting from the third eight-byte memory boundary (1010H). In step 650, the second input vector contained in input register VB is combined with the third input vector contained in the input register VA as a function of the alignment vector contained in the control register using the PWR operation. As will be appreciated, the same control vector loaded in control register VC calculated in 610 will properly align the second input vector with the third input vector within the output register VT. Therefore, the alignment vector does not have to be recalculated for subsequent register words of the same input vector loaded from memory 400.

At step 655, a vector operation is performed on the output vector contained within output register VT. At decision block 660, it is determined whether the end of the input vector(s) has been reached. If it has, the process ends at step 665. If more of the vector (or additional vectors) remains to be loaded into the register file, the process returns to step 620 where the memory pointer is incremented by the register word to allow the next eight bytes of the input vector to be loaded into the vector register files.

With reference now to FIG. 7, there is shown a conceptual diagram of the vector registers as used in one example of a PWR operation performed in a 16-byte-based register file for the data processing system of the present invention. The control vector register VC is loaded with a control vector designated by the operational code or computationally derived from a previous operation to implement a desired high-performance data processing function. Each of the input registers VA and VB are loaded with properly aligned data vectors to be processed. The data processing system of the present system then performs a PWR operation on the two input vectors VA, VB as a function of the control vector loaded in the control register VC. Registers VA and VB are addressed as 32 separate elements. As can be seen in FIG. 7, each byte in a given column of the control vector has an index value uniquely identifying one of the 32 bytes (0–1FH) within the two input vectors that is loaded into a corresponding column within the output register. In the example of FIG. 7, the control vector indicates that the first byte of VT should be loaded with the second byte ("1") of the data vector (the second byte of register VA) and the second byte of register VT should be loaded with the twenty-first byte ("14H") of the data vector (the fifth byte of register VB). Further, it can be seen that the ninth, tenth and eleventh fields of the control vector indicate that the corresponding fields of the output vector should be loaded with the replicated byte located in field "1C" of the input vector (the thirteenth byte loaded in register VB). Thus, it can be seen that the PWR operation performs a permutation on the input vector that can include the replication of specific bytes in multiple bytes of the output vector.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true scope of the invention.

We claim:

1. A method for combining, in accordance with a control vector, at least a first input vector and a second input vector to create an output vector, each vector comprising at least first and second vector elements, the method comprising the steps of:

storing said first input vector;

storing said second input vector;

storing said control vector;

in response to the first vector element of said control vector, storing, as the first vector element of said output vector, a selected one of (1) the first vector element of the first input vector, (2) the second vector element of the first input vector, (3) the first vector element of the second input vector, or (4) the second vector element of the second input vector; and in response to the second vector element of said control vector, storing, as the second vector element of said output vector, a selected one of (1) the first vector element of the first input vector, (2) the second vector element of the first input vector, (3) the first vector element of the second input vector, or (4) the second vector element of the second input vector.

2. The method of claim 1 wherein the vector elements of said input vectors comprise a set of $2^n$ input vector elements, and wherein each of said vector elements of said control vector selects one of said $2^n$ input vector elements.

3. The method of claim 1 wherein each of said first and second input vectors comprise $2^{n-1}$ input vector elements, and wherein each of said vector elements of said control vector selects one of said $2^n$ input vector elements.

4. A method for combining in an output vector, vector elements of a first input vector and a second input vector, selected in accordance with a control vector, each vector comprising at least first and second vector elements, the method comprising the steps of:

storing said first input vector;

storing said second input vector;

storing said control vector;

selecting, in response to each vector element of said stored control vector, a respective one of the vector elements of said stored input vectors; and storing each of said selected vector elements as a respective one of the vector elements of said output vector, the output vector being the same size as the first input vector and the second input vector.

5. The method of claim 4 wherein the vector elements of said input vectors comprise a set of $2^n$ input vector elements, and wherein each of said vector elements of said control vector selects one of said $2^n$ input vector elements.

6. The method of claim 4 wherein each of said first and second input vectors comprise $2^{n-1}$ input vector elements, and wherein each of said vector elements of said control vector selects one of said $2^n$ input vector elements.

7. An apparatus for combining, in accordance with a control vector, at least a first input vector and a second input vector to create an output vector, each vector comprising at least first and second vector elements, the apparatus comprising:

a first vector register for storing said first input vector;

a second vector register for storing said second input vector;

a third vector register for storing said control vector;

a combination network coupled to the first vector register, to the second vector register and to the third vector register for selecting, in response to each vector element stored in said third vector, a respective one of vector elements stored in said first and said second vector registers; and a fourth vector register for storing each of said selected vector elements.

8. The apparatus of claim 7 wherein the vector elements of said first and second vector registers comprise a set of $2^n$ input vector elements, and wherein, in response to each of said vector elements of said control vector, the combination network selects one of said $2^n$ input vector elements.

9. The apparatus of claim 7 wherein the vector elements of each of said first and second vector registers comprise $2^{n-1}$ input vector elements, and wherein, in response to each of said vector elements of said control vector, the combination network selects one of said $2^n$ input vector elements.

* * * * *